US012549453B2

(12) United States Patent
Iguchi

(10) Patent No.: US 12,549,453 B2
(45) Date of Patent: Feb. 10, 2026

(54) TERMINAL DEVICE, PROCESSING SYSTEM, AND NON-TRANSITORY COMPUTER-READABLE STORAGE MEDIUM FOR AUTOMATICALLY STORING ACCOUNT INFORMATION

(71) Applicant: SEIKO EPSON CORPORATION, Tokyo (JP)

(72) Inventor: Masato Iguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/191,981

(22) Filed: Mar. 29, 2023

(65) Prior Publication Data

US 2023/0327946 A1 Oct. 12, 2023

(30) Foreign Application Priority Data

Mar. 30, 2022 (JP) ................................. 2022-056170

(51) Int. Cl.
*H04L 41/28* (2022.01)
*G06F 21/60* (2013.01)
(Continued)

(52) U.S. Cl.
CPC ............ *H04L 41/28* (2013.01); *G06F 21/608* (2013.01); *H04L 41/0803* (2013.01);
(Continued)

(58) Field of Classification Search
CPC ... H04L 41/28; H04L 41/0803; H04L 41/085; H04L 63/0876; G06F 21/608; G06F 2221/2105
See application file for complete search history.

(56) References Cited

U.S. PATENT DOCUMENTS 6,785,022 B1 * 8/2004 Todaka .............. H04N 1/00127
358/1.15
2004/0030922 A1 * 2/2004 Koss ..................... H04L 63/08
726/10
(Continued)

FOREIGN PATENT DOCUMENTS

CN 104486354 A * 4/2015 ........... H04L 63/062
CN 110443937 A * 11/2019
(Continued)

*Primary Examiner* — Lance Leonard Barry
(74) *Attorney, Agent, or Firm* — CHIP LAW GROUP

(57) ABSTRACT

Provided is a terminal device that includes a communicator that communicates with an electronic instrument operable in a first mode that is a normal mode and in a second mode, a storage, and a processor. The processor acquires, from the electronic instrument which is in the second mode, predetermined account information for performing predetermined processing with the electronic instrument in the first mode. The storage stores the acquired predetermined account information. The predetermined account information is acquired by a first application program. The processor installs a second application program and performs the predetermined processing according to the second application program with the electronic instrument in the first mode, where the first application program is different from the second application program.

11 Claims, 12 Drawing Sheets

(51) Int. Cl.
*H04L 9/40* (2022.01)
*H04L 41/0803* (2022.01)
*H04L 41/085* (2022.01)

(52) U.S. Cl.
CPC ........ *H04L 41/085* (2013.01); *H04L 63/0876* (2013.01); *G06F 2221/2105* (2013.01)

(56) References Cited

U.S. PATENT DOCUMENTS

| | | | |
|---|---|---|---|
| 2009/0083555 A1* | 3/2009 | Challener | G06F 21/74 709/217 |
| 2010/0110133 A1* | 5/2010 | Yoshida | B41J 11/425 347/14 |
| 2016/0004851 A1* | 1/2016 | Suzuki | G06F 21/31 726/7 |
| 2017/0070951 A1* | 3/2017 | Takeuchi | H04W 48/20 |
| 2017/0202035 A1* | 7/2017 | Yokoyama | H04N 1/00315 |
| 2019/0014226 A1* | 1/2019 | Osuka | H04W 76/14 |
| 2022/0236927 A1* | 7/2022 | Sakamoto | G06F 3/121 |
| 2023/0216732 A1* | 7/2023 | Liu | H04L 67/146 709/220 |

FOREIGN PATENT DOCUMENTS

| | | | | |
|---|---|---|---|---|
| EP | 0856785 A2 * | 8/1998 | | |
| EP | 2317429 A2 * | 5/2011 | ........... | G06F 3/1203 |
| JP | H09152948 A | 6/1997 | | |

\* cited by examiner

FIG. 6

| PREDETERMINED ACCOUNT | | ADMINISTRATOR ACCOUNT | |
|---|---|---|---|
| | | UNREGISTERED | REGISTERED |
| UNREGISTERED | | NEITHER EXECUTION OF PREDETERMINED PROCESSING NOR SETTING OF PROCESSING IS POSSIBLE | EXECUTION OF PREDETERMINED PROCESSING AND SETTING OF PROCESSING ARE POSSIBLE |
| REGISTERED | INVALID | | |
| | VALID | EXECUTION OF PREDETERMINED PROCESSING IS POSSIBLE | |

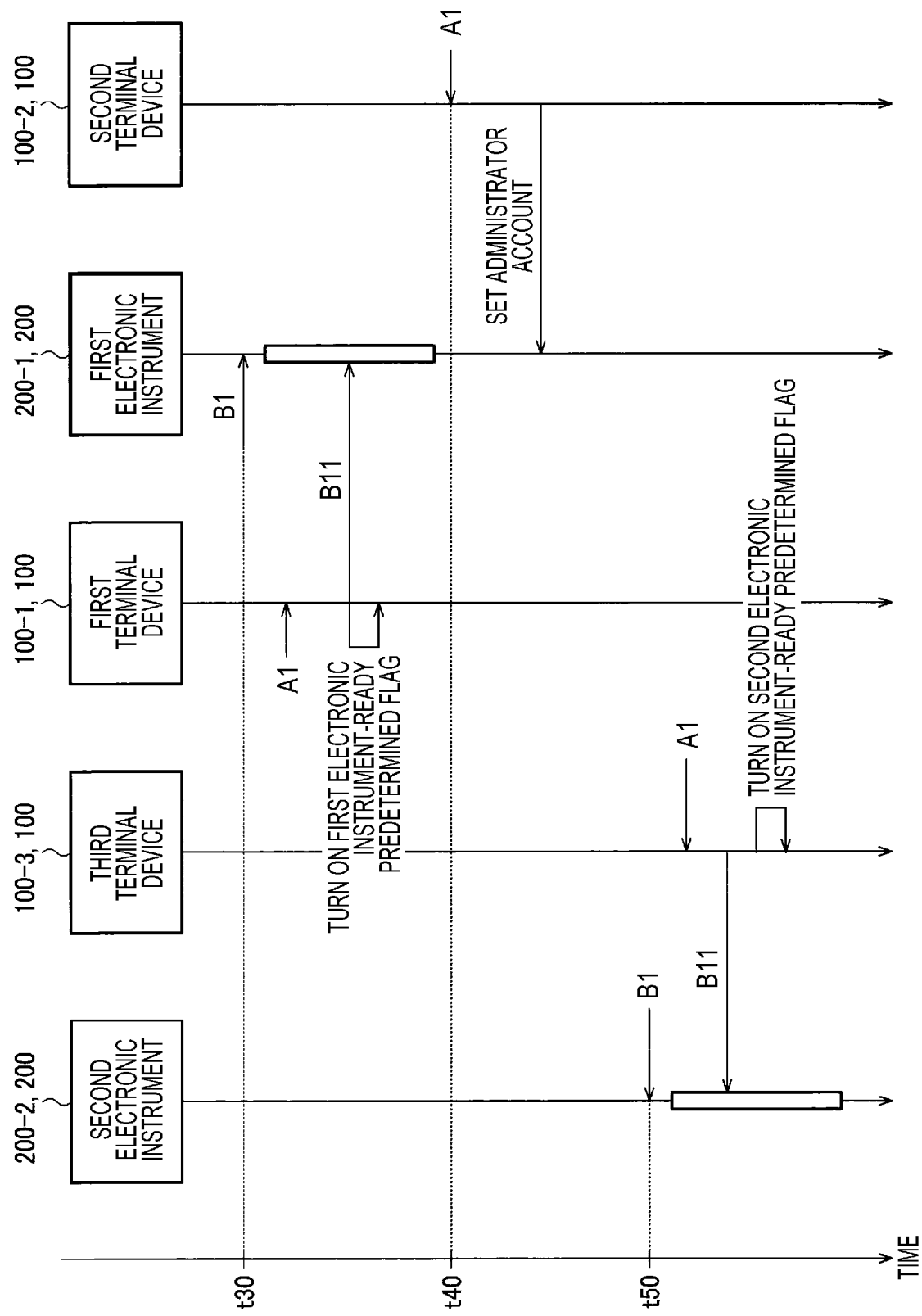

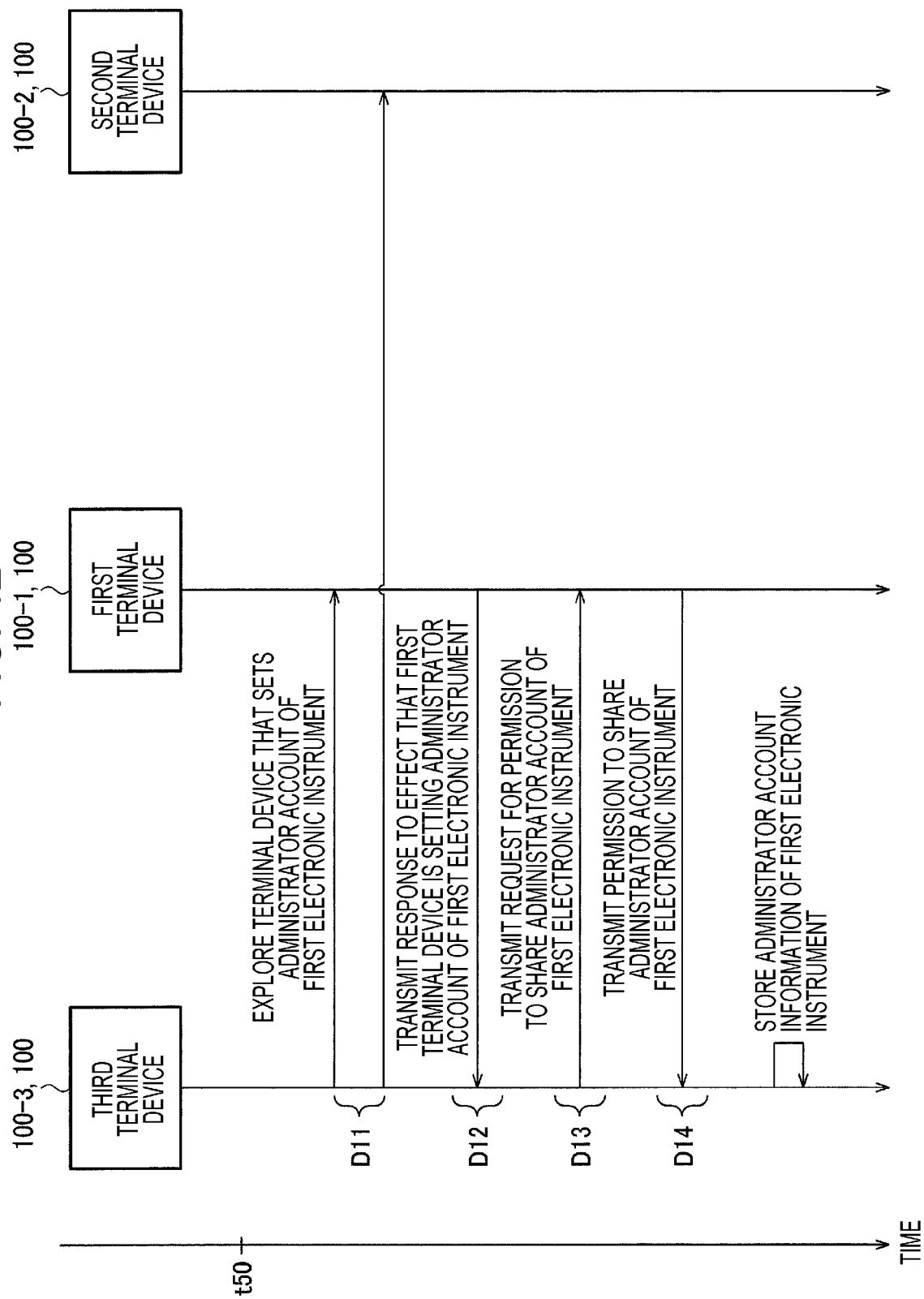

TERMINAL DEVICE, PROCESSING SYSTEM, AND NON-TRANSITORY COMPUTER-READABLE STORAGE MEDIUM FOR AUTOMATICALLY STORING ACCOUNT INFORMATION

The present application is based on, and claims priority from JP Application Serial Number 2022-056170, filed Mar. 30, 2022, the disclosure of which is hereby incorporated by reference herein in its entirety.

BACKGROUND

1. Technical Field

The present disclosure relates to a terminal device, a processing system, a non-transitory computer-readable storage medium storing a program, and the like.

2. Related Art

Heretofore, a terminal device capable of being coupled to an electronic instrument via a network has been known. JP-A-9-152948 discloses a method in which an image forming apparatus or a host computer, which is an electronic instrument, includes password setting means for setting a password, and password storage means for storing the password.

However, in the method disclosed in JP-A-9-152948, since a user inputs the password, it is necessary for the user him/herself to manage the password. Moreover, JP-A-9-152948 does not disclose a method for acquiring account information, which is for use when the electronic instrument operates in a first mode, from the electronic instrument that operates in a second mode, or the like.

SUMMARY

An aspect of the present disclosure relates to a terminal device including: a communication unit that communicates with an electronic instrument operable in a first mode that is a normal mode and in a second mode; a storage unit; and a processing unit. The second mode is a mode for setting predetermined account information for performing predetermined processing with the electronic instrument in the first mode. The storage unit stores the predetermined account information. The processing unit performs predetermined processing with the electronic instrument in accordance with the predetermined account information stored in the storage unit in the first mode.

Moreover, an aspect of the present disclosure relates to a processing system including: the above-described terminal device; and the electronic instrument.

Further, an aspect of the present disclosure relates to a non-transitory computer-readable storage medium storing a program for causing a computer to function as: a communication unit that communicates with an electronic instrument operable in a first mode that is a normal mode and in a second mode; a storage unit; and a processing unit. The second mode is a mode for setting predetermined account information for performing predetermined processing with the electronic instrument in the first mode. The storage unit stores the predetermined account information. The processing unit performs predetermined processing with the electronic instrument in accordance with the predetermined account information stored in the storage unit in the first mode.

BRIEF DESCRIPTION OF THE DRAWINGS

FIG. 6 is a diagram explaining differences between the predetermined account and the administrator account.

FIG. 11 is a diagram explaining a method for sharing administrator account information between the different terminal devices.

FIG. 12 is another diagram explaining the method for sharing the administrator account information between the different terminal devices.

DESCRIPTION OF EXEMPLARY EMBODIMENTS

This embodiment will be described below. Note that this embodiment to be described below does not unreasonably restrict contents of the present disclosure described in the scope of claims. Moreover, all configurations to be described in this embodiment are not always essential configuration requirements of the present disclosure.

Figure 1:
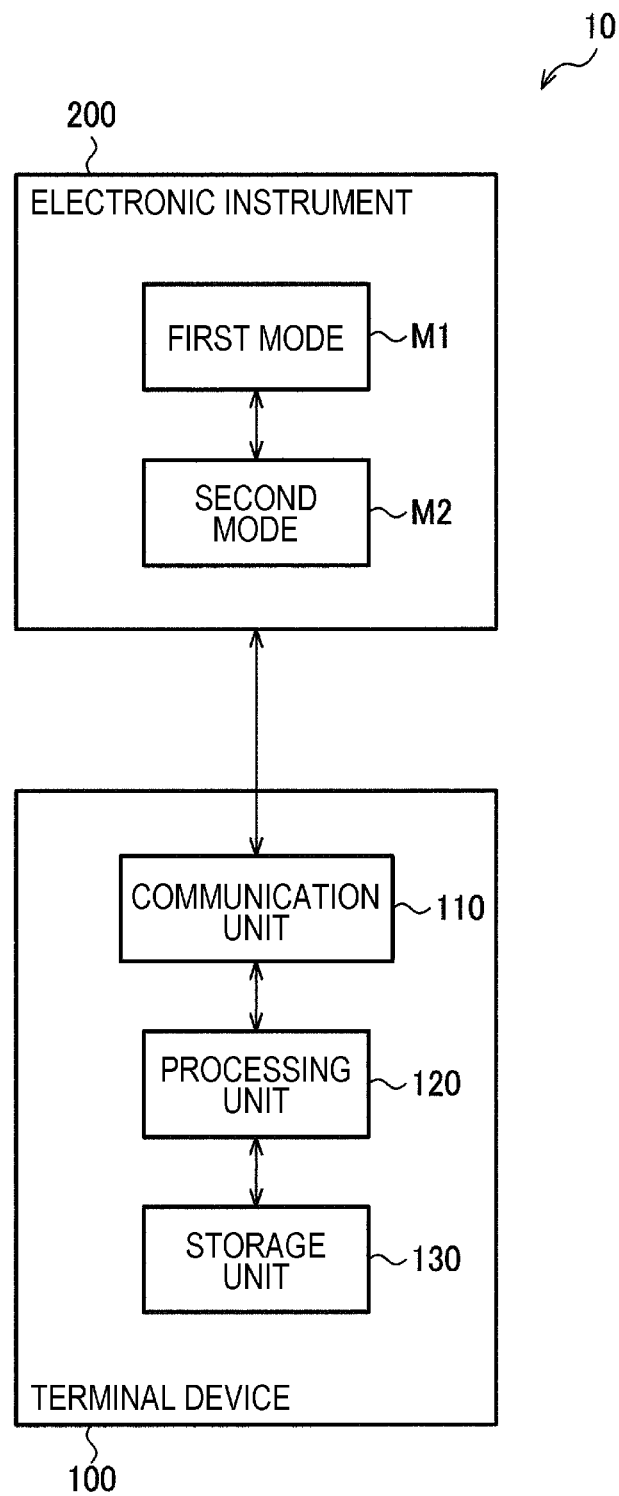
FIG. 1 is a diagram explaining a configuration example of a processing system including a terminal device and an electronic instrument.

FIG. 1 is a block diagram explaining a configuration example of a processing system 10 including a terminal device 100 and an electronic instrument 200 according to this embodiment. The terminal device 100 includes a communication unit 110, a processing unit 120, and a storage unit 130.

The terminal device 100 according to this embodiment is, for example, a personal computer, but may be a portable information terminal such as a smartphone, or the like. Moreover, the electronic instrument 200 according to this embodiment is, for example, a printer, but may be a scanner, a personal computer, a wearable instrument, a living body information measuring instrument, a robot, a video instrument, a physical quantity measuring instrument, or the like. Note that the wearable instrument refers to a smart watch, an activity tracker, or the like. Moreover, the living body information measuring instrument refers to a pulse meter, a pedometer, or the like. Further, the video instrument refers to a camera, a projector, or the like. Furthermore, the physical quantity measuring instrument refers to a thermometer, a scale, or the like. Moreover, the printer mentioned herein includes a multifunction peripheral. The multifunction peripheral refers to a printer including a function other than a printer function, and the function other than the printer function is a copy function, a fax function, a scanner function, or the like, but may be other functions.

The communication unit 110 is a communication interface to be communicably coupled to an external device via a network. This communication interface can be achieved by a single semiconductor device that has a communication function conforming to a predetermined communication standard, but may be achieved by a function of a part of a semiconductor device that also has other functions. The semiconductor device is, for example, a communication integrated circuit (IC). Note that the predetermined communication standard may be, for example, a standard for wired communication, such as Ethernet (registered trademark) and a universal serial bus (USB), or a standard for wireless communication, such as Wi-Fi (registered trademark) and Bluetooth (registered trademark), but may be other communication standards. Moreover, in the case of wireless communication with the predetermined communication standard conforming to the standard of Wi-Fi mentioned above, the wireless communication can be achieved by passing via an access point (not shown). Specifically, the access point (not shown) periodically transmits a wireless communication radio wave such as a beacon so that it is possible to decipher identification information of itself. Moreover, the identification information of the access point is, for example, a service set identifier (SSID). Further, when the terminal device 100 receives the radio wave from the access point, a user inputs a predetermined password to the terminal device 100, so that the terminal device 100 becomes capable of being coupled to this access point. Furthermore, when the user couples the terminal device 100 to the same access point again, the user can automatically couple the terminal device 100 to this access point without inputting the password to the terminal device 100. Moreover, the access point can also be called a router.

The processing unit 120 performs a control for the respective units in the terminal device 100, the units including the communication unit 110 and the like. Specifically, the processing unit 120 is a processor or a controller. For example, the processing unit 120 can include a plurality of central processing units (CPUs) such as a main CPU and a sub CPU. The main CPU performs the control for the respective units of the terminal device 100, and an overall control for the terminal device 100. The sub CPU is, for example, a CPU that performs a communication control for the communication unit 110. Note that, when the terminal device 100 is a printer, a CPU that performs a variety of processing for printing may be further provided.

The storage unit 130 stores a variety of information such as data and a program. Moreover, the processing unit 120 operates, for example, by using the storage unit 130 as a work area. The storage unit 130 can be achieved by a semiconductor memory such as a static random access memory (SRAM) and a dynamic random access memory (DRAM), but may be achieved by a magnetic storage device such as a register and a hard disk device or an optical storage device such as an optical disk device.

Moreover, the processing unit 120 according to this embodiment can be composed of the following hardware. The hardware can include at least one of a circuit that processes a digital signal and a circuit that processes an analog signal. For example, the hardware can be composed of one or a plurality of circuit devices mounted on a circuit board, or of one or a plurality of circuit elements mounted thereon. Note that the circuit device is, for example, an integrated circuit device. Moreover, the circuit element is, for example, an active element such as a transistor or a passive element such as a resistor and a capacitor. Further, the processing unit 120 can be achieved by the following processor. The processor includes hardware. Moreover, a variety of processors are usable as the processor, the variety of processors including a CPU, a graphics processing unit (GPU), a digital signal processor (DSP), and the like. Further, the storage unit 130 stores, for example, an instruction readable by a computer, and the processor executes this instruction, so that the function of the processing unit 120 is achieved as processing. Note that the instruction may be an instruction of an instruction set that constitutes a program, or may be an instruction that directs an action to a hardware circuit of the processor, and further, all or a part of the processing unit 120 may be achieved by cloud computing.

Note that, though illustration in FIG. 1 and the like is omitted, the above-mentioned electronic instrument 200 also includes a processor equivalent to the processing unit 120, and a memory equivalent to the storage unit 130, and achieves a function as an electronic instrument processing unit. Moreover, the electronic instrument 200 further includes a communication interface equivalent to the communication unit 110, and achieves a function as an electronic instrument communication unit. In the following description, the processing performed by the processing unit 120 of the terminal device 100 is sometimes simply referred to as processing performed by the terminal device 100 or processing performed by the processing unit 120. Moreover, such an action that the processing unit 120 of the terminal device 100 transmits/receives data and the like via the communication unit 110 is sometimes simply referred to as an action that the terminal device 100 transmits/receives data and the like. Further, the processing performed by the electronic instrument processing unit of the electronic instrument 200 is sometimes simply referred to as processing performed by the electronic instrument 200. Furthermore, such an action that the electronic instrument processing unit of the electronic instrument 200 transmits/receives data and the like via the electronic instrument communication unit is sometimes simply referred to as an action that the electronic instrument 200 transmits/receives data and the like.

Figure 2:
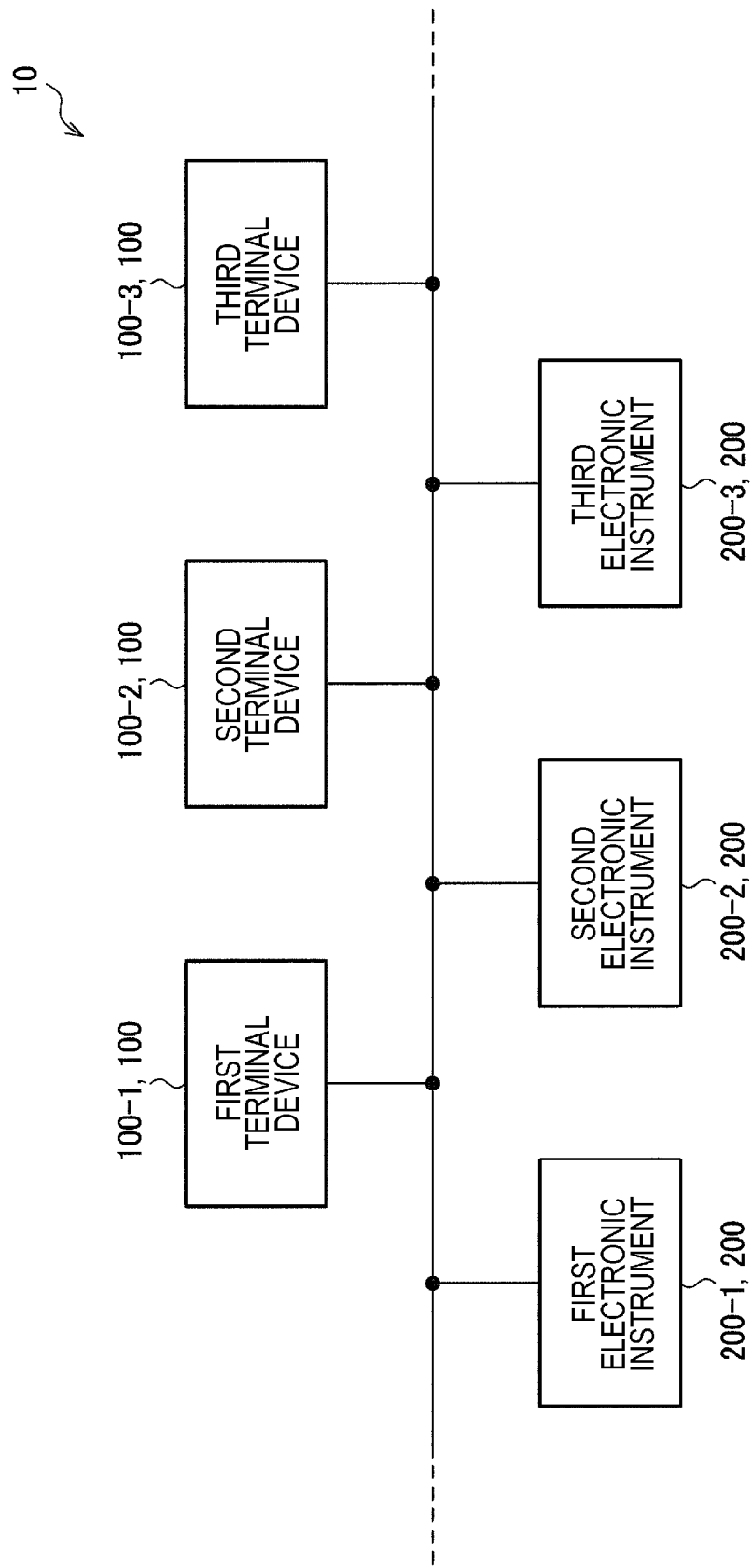
FIG. 2 is a diagram explaining another configuration example of the processing system.

The configuration of the processing system 10 according to this embodiment is not limited to FIG. 1. For example, a plurality of the terminal devices 100 and a plurality of the electronic instruments 200 may be coupled to each other. For example, as illustrated in FIG. 2, a first terminal device 100-1, a second terminal device 100-2, and a third terminal device 100-3, each of which serves as the terminal device 100, may be coupled to the same network, and further, a first electronic instrument 200-1, a second electronic instrument 200-2, and a third electronic instrument 200-3, each of which serves as the electronic instrument 200, may be coupled to this network. Note that the number of the terminal devices 100 included in the processing system 10 is not limited to three, or the number of the electronic instruments 200 included in the processing system 10 is not limited to three.

The electronic instrument 200 according to this embodiment can operate in a first mode M1. The first mode M1 is, for example, an initial mode after power is applied to the electronic instrument 200 and execution of a boot program is ended, and can also be referred to as a normal mode. In order to perform predetermined processing for the electronic instrument 200, for example, by a predetermined application, which is installed in the terminal device 100, when the electronic instrument 200 according to this embodiment operates in the first mode M1, it is necessary to set an account in some cases.

The predetermined application according to this embodiment is software automatically executed in a background of the terminal device 100, and for example, includes a resident application that automatically starts following start of an operation system (OS) of the terminal device 100, and the like. Specifically, for example, the predetermined application is a driver application for operating the electronic instrument 200, an application for monitoring a status of use of the electronic instrument 200, an application for changing setting of the electronic instrument 200, or the like, but may be an application that corresponds to a charging system, or the like. Note that a first application and a second application, which will be described later, are examples of the predetermined application. Moreover, in the following description, processing performed by an application program of the predetermined application, and the like are sometimes simply referred to as processing performed by the predetermined application, and the like, and in the following illustration, the application is sometimes simply abbreviated as APP. For example, the predetermined processing is output processing of information indicating the status of use of the electronic instrument 200, setting changing processing of the electronic instrument 200, output processing of information indicating a status of charge for use of the electronic instrument 200, or the like, but may be other processing.

For example, in the processing system 10 of FIG. 2, when a user of the first terminal device 100-1 desires to perform the predetermined processing for the electronic instrument 200 that is desired, first, it is necessary to install the predetermined application in the first terminal device 100-1. When the predetermined application is installed in the first terminal device 100-1, for example, a setting screen (not shown), in which such electronic instruments 200 to be subjected to the predetermined processing are listed, is displayed on a display unit (not shown). The electronic instruments 200 to be subjected to the predetermined processing are, for example, are the first electronic instrument 200-1, the second electronic instrument 200-2, and the third electronic instrument 200-3, which are coupled to the same network.

Then, as mentioned above, the user is sometimes required to set the account after selecting the desired electronic instrument 200. In this case, the user inputs, for example, information such as a user ID and a password as account information, so that the setting of the account is completed, and the installation of the predetermined application is completed. For example, when the user manages the password while differentiating the same between the electronic instruments 200, a burden on the user about the password management increases as the number of the electronic instruments 200 included in the processing system 10 increases.

Moreover, the terminal device 100 according to this embodiment can acquire predetermined account information from the electronic instrument 200 that operates in a second mode M2. For example, it is assumed that the terminal device 100 and the electronic instrument 200, which are illustrated in FIG. 1, are coupled to each other by wireless communication that conforms to the Bluetooth standard mentioned above. Then, when the user installs the predetermined application in the terminal device 100, an account setting screen is displayed on the display unit (not shown), and on this account setting screen, the user is required to input the password. At this time, for example, when the user performs an operation of shifting the electronic instrument 200 from the first mode M1 to the second mode M2, the terminal device 100 performs processing for acquiring the predetermined account information from the electronic instrument 200. For example, upon shifting to the second mode M2, the electronic instrument 200 transmits, to the terminal device 100, a packet indicating that the electronic instrument 200 is in the second mode M2, the terminal device 100 transmits, to the electronic instrument 200, a packet requesting the predetermined account information, and the electronic instrument 200 transmits, to the terminal device 100, a response packet including the predetermined account information. Then, the terminal device 100 that acquires this predetermined account information performs processing for storing the predetermined account information in the storage unit 130. Note that this account information may be information prestored in the electronic instrument 200, or may be information automatically generated at timing when the electronic instrument 200 shifts to the second mode M2. Note that, though a specific example of the operation of shifting the electronic instrument 200 from the first mode M1 to the second mode M2 will be described later, the operation just needs to be an operation performed directly for the electronic instrument 200. Thus, for example, on the account setting screen displayed on the display unit (not shown) of the terminal device 100, information of the password will be made to be input automatically. Thus, the user can complete the installation of the predetermined application into the terminal device 100. That is, the second mode M2 is a mode in which priority is given to convenience, in which the account is easily settable, rather than to security.

As described above, the terminal device 100 according to this embodiment includes: the communication unit 110 that communicates with the electronic instrument 200 operable in the first mode M1 that is a normal mode and in the second mode M2; the storage unit 130; and the processing unit 120. The second mode M2 is a mode for setting the predetermined account information for performing the predetermined processing with the electronic instrument 200 in the first mode M1. The storage unit 130 stores the predetermined account information. The processing unit 120 performs the predetermined processing with the electronic instrument 200 in accordance with the predetermined account information stored in the storage unit 130 in the first mode M1.

The terminal device 100 according to this embodiment includes the communication unit 110 as described above, and accordingly, can communicate with the electronic instrument 200 that operates in the first mode M1. Moreover, the terminal device 100 according to this embodiment includes the processing unit 120, and accordingly, can perform the predetermined processing for the electronic instrument 200 that operates in the first mode M1. Further, in the terminal device 100 according to this embodiment, the communication unit 110 makes communication with the electronic instrument 200 that operates in the second mode M2, and the storage unit 130 stores the predetermined account information in accordance with the communication with the electronic instrument 200 that operates in the second mode M2. Accordingly, the user no longer needs to set the predetermined account information with the electronic instrument 200 that operates in the first mode M1. Thus, the burden on the user about the account management of the electronic instrument 200 can be reduced. Heretofore, no proposal has been made for the terminal device 100 that acquires, from the electronic instrument 200 that operates in the second mode M2, the account information for performing the predetermined processing for the electronic instrument 200 that operates in the first mode M1.

Moreover, the method according to this embodiment may be achieved as the processing system 10. That is, the processing system 10 according to this embodiment includes the above-described terminal device 100 and the electronic instrument 200. In this way, similar effects to those described above can be obtained.

Moreover, the method according to this embodiment may be achieved as a program. That is, a program according to this embodiment causes a computer to function as: a communication unit 110 that communicates with an electronic instrument 200 operable in a first mode M1 that is a normal mode and in a second mode M2; a storage unit 130; and a processing unit 120. The second mode M2 is a mode for setting predetermined account information for performing predetermined processing with the electronic instrument 200 in the first mode M1. The storage unit 130 stores predetermined account information. The processing unit 120 performs predetermined processing with the electronic instrument 200 in accordance with the predetermined account information stored in the storage unit 130 in the first mode M1. In this way, similar effects to those described above can be obtained.

Figure 3:
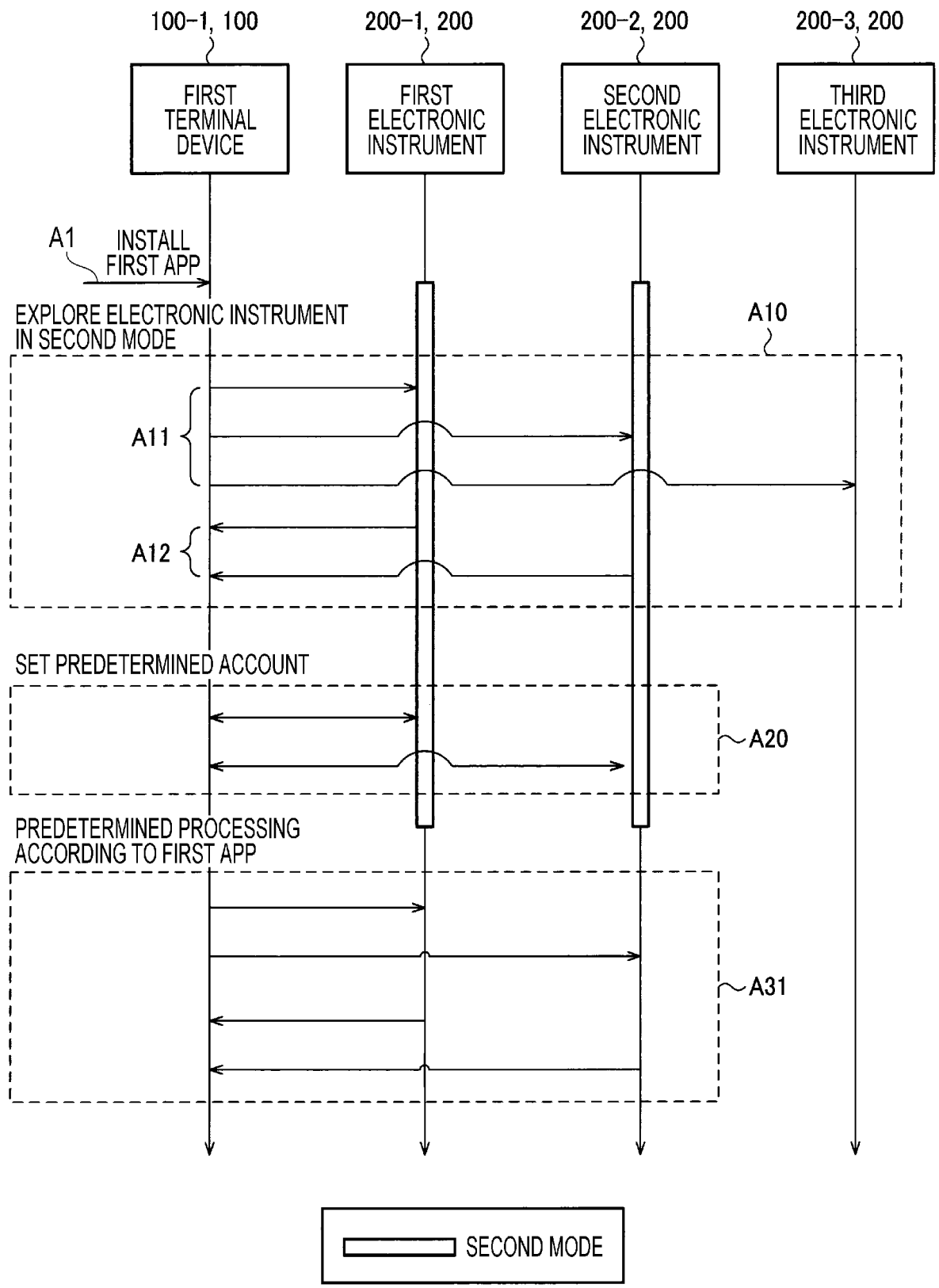
FIG. 3 is a diagram explaining flows of respective pieces of processing by a first application.

The method according to this embodiment is not limited to the above, and can be modified and implemented variously. For example, as a modified example, when the terminal device 100 according to this embodiment is coupled to the plurality of electronic instruments 200, the terminal device 100 may perform processing for collectively exploring the electronic instruments 200 which operate in the second mode M2. Referring to FIG. 3, a flow of processing applied with the method of the modified example will be described. Note that, in the modified example, it is assumed that the first terminal device 100-1 as the terminal device 100 and the first electronic instrument 200-1, the second electronic instrument 200-2 and the third electronic instrument 200-3, which serve as the electronic instruments 200, are coupled to the same network. Moreover, in FIG. 3, it is assumed that the time progresses downward on the space thereof, where a length of each downward arrow does not indicate a time length of specific processing. The same as above also applies to FIG. 4 and after.

For example, it is assumed that the user performs an operation of installing the first application, which is the predetermined application, in the first terminal device 100-1. In the following description and illustration, the operation where the user installs the first application in the terminal device 100 is sometimes denoted as A1. Then, as illustrated in A10, the first terminal device 100-1 performs, as initial setting of the first application, processing for exploring the electronic instrument 200, which is operating in the second mode M2, from among the electronic instruments 200 which belong to the network. More specifically, as illustrated in A11, the processing unit 120 of the first terminal device 100-1 multicasts a response request, which asks whether or not to be operating in the second mode M2, to the first electronic instrument 200-1, the second electronic instrument 200-2, and the third electronic instrument 200-3. At this time, it is assumed that the first electronic instrument 200-1 and the second electronic instrument 200-2 are operating in the second mode M2, and that the third electronic instrument 200-3 is operating in the first mode M1. In this case, as illustrated in A12, each of the first electronic instrument 200-1 and the second electronic instrument 200-2 performs processing for transmitting, to the first terminal device 100-1, a response packet to the effect that each of the first electronic instrument 200-1 and the second electronic instrument 200-2 is operating in the second mode M2. Thus, the first terminal device 100-1 recognizes that the first electronic instrument 200-1 and the second electronic instrument 200-2 are operating in the second mode M2.

Thereafter, as illustrated in A20, the first terminal device 100-1 performs processing for setting a predetermined account with each of the first electronic instrument 200-1 and the second electronic instrument 200-2. Note that, though details will be described later in FIG. 4, a part of the processing regarding the setting of the predetermined account is performed before the processing of A10, but in FIG. 3, for convenience, illustration is made so that the entire processing of A20 is performed after the entire processing of A10. The same as above also applies to FIG. 7, FIG. 8, and FIG. 11, which will be described later. Moreover, though not shown in FIG. 3, the first electronic instrument 200-1 and the second electronic instrument 200-2 are configured to shift from the second mode M2 to the first mode M1 when the processing of A20 is ended, details of which will be described later with reference to FIG. 4.

Thereafter, as illustrated in A31, the first terminal device 100-1 performs the predetermined processing for the first electronic instrument 200-1, which operates in the first mode M1, by using the predetermined account. More specifically, for example, when the first application is an application that monitors the status of use of the electronic instrument 200, the first application automatically starts following start of the first terminal device 100-1. Then, for example, the first terminal device 100-1 performs processing for automatically inputting a user ID, a password, and the like, which constitute the predetermined account stored in the storage unit 130, and in addition, starts, as the predetermined processing, processing for monitoring the status of use of the first electronic instrument 200-1 via the network. Moreover, the first terminal device 100-1 automatically starts the predetermined processing also for the second electronic instrument 200-2 that starts to operate in the first mode M1.

Figure 4:
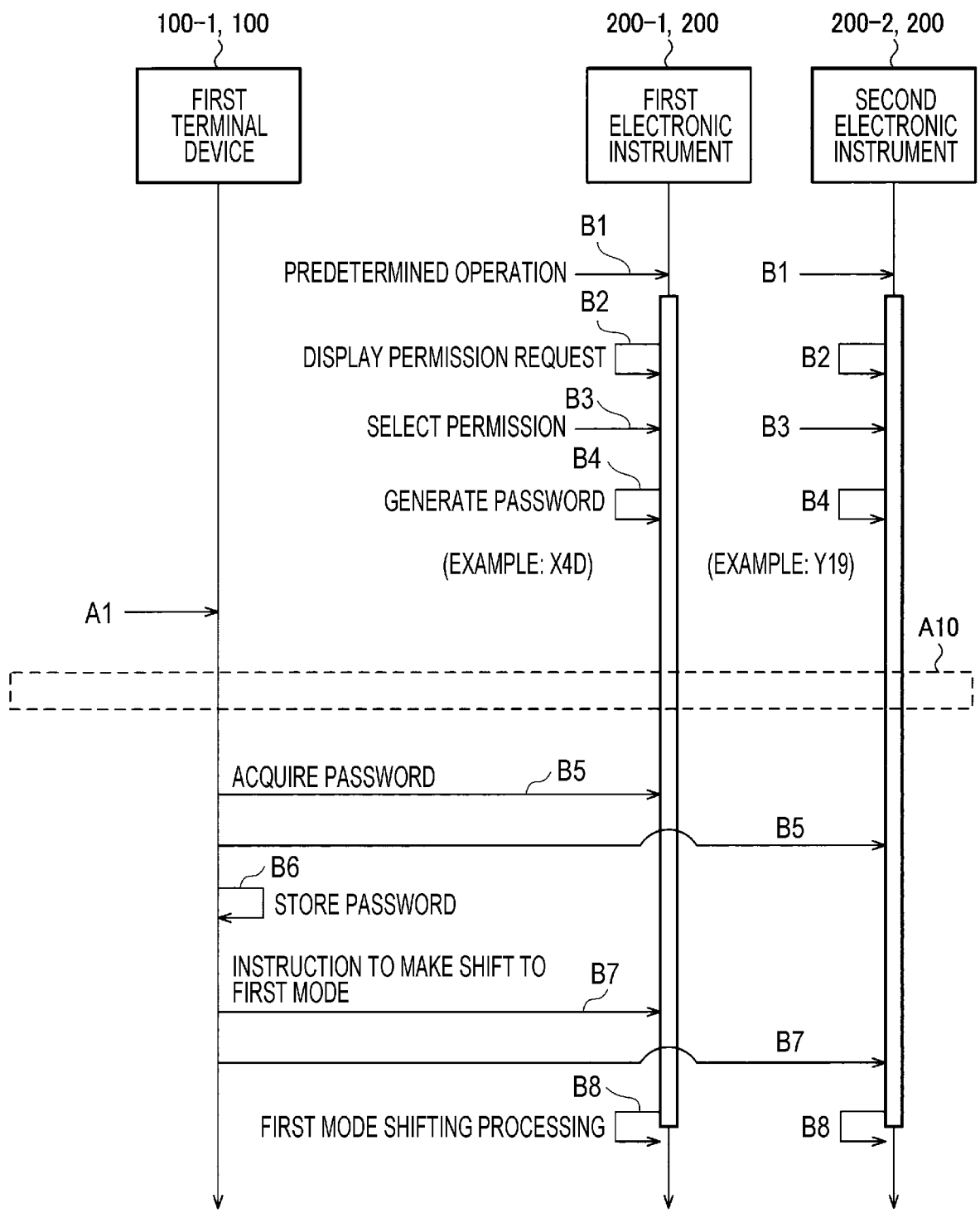
FIG. 4 is a diagram more specifically explaining a flow of setting processing of a predetermined account.

FIG. 4 is a diagram more specifically explaining a flow of the processing illustrated in A20 of FIG. 3. FIG. 4 illustrates only a relationship between the first terminal device 100-1, the first electronic instrument 200-1, and the second electronic instrument 200-2, which are involved in the processing of A20, and omits illustration regarding the third electronic instrument 200-3.

At timing before timing when the user performs the operation of installing the first application in the first terminal device 100-1, for example, the user performs a predetermined operation for the first electronic instrument 200-1 that is operating in the first mode M1. Thus, the mode of the first electronic instrument 200-1 shifts from the first mode M1 to the second mode M2. In the following description and illustration, this predetermined operation is sometimes denoted as B1. Specifically, the predetermined operation is, for example, an operation performed for a certain period of time or more for a predetermined operating unit included in the electronic instrument 200, and the like. The predetermined operating unit may be a dedicated button, and for example, may be a button to apply power. For example, when the user long-presses such a power-on button for a first period of time or more, the electronic instrument 200 is applied with power, and the electronic instrument 200 turns to the first mode M1, and when the user further long-presses the power-on button for a second period of time or more, which is longer than the first period of time, the electronic instrument 200 shifts to the second mode M2. That is, in the terminal device 100 according to this embodiment, the second mode M2 is a mode to which the electronic instrument 200 shifts from the first mode M1 by the predetermined operation performed for the electronic instrument 200 by the user. In this way, a condition for shifting the electronic instrument 200 from the first mode M1 to the second mode M2 can be optimized. In other words, for example, a remote control is not allowed to be used for shifting the electronic instrument 200 from the first mode M1 to the second mode M2. This is because the second mode M2 is a mode in which convenience is given priority rather than to security as mentioned above, and from a viewpoint of security, it is not desired to allow the remote control to shift the electronic instrument 200 to the second mode M2. Moreover, the user performs the operation of B1 also for the second electronic instrument 200-2. That is, the user manually performs the operation of B1 for each of all the electronic instruments 200 to be subjected to the predetermined processing by the first terminal device 100-1.

In the electronic instrument 200, for example, the first mode M1 and the second mode M2 can be distinguished from each other in accordance with ON/OFF of a predetermined mode flag. For example, the predetermined mode flag is set OFF immediately after the electronic instrument 200 starts, and by the above-mentioned predetermined operation, the electronic instrument 200 performs processing for turning ON this predetermined mode flag. Then, by such a method as referring to the predetermined mode flag as to whether the electronic instrument 200 itself is operating in the second mode M2, the electronic instrument 200 appropriately determines whether or not to perform the transmission processing of A12 in FIG. 3.

Then, the first electronic instrument 200-1 performs processing for displaying a permission request on the display unit (not shown). In the following description and illustration, the processing for displaying this permission request is sometimes denoted as B2. For example, though not shown, on this display unit (not shown), the first electronic instrument 200-1 performs processing for making a display to ask the user whether or not to permit the first terminal device 100-1 to set the predetermined account. Note that this display unit (not shown) may be, for example, a dedicated display unit indicating that the first electronic instrument 200-1 is in the second mode M2, or for example, may be a touch panel in which an operating unit (not shown) is integrated with the display unit.

After the display illustrated in B2 is performed, the user performs an operation of selecting the permission. In the following description and illustration, the operation of selecting this permission is sometimes denoted as B3. For example, by the above-mentioned processing of B2, an icon of "Rejection" and an icon of "Permission" are individually displayed on the display unit. Then, for example, the user performs an operation of selecting the icon of "Permission".

Thereafter, the first electronic instrument 200-1 performs processing for generating the password as the predetermined account information. In the following description and illustration, the processing for generating the password is sometimes denoted as B4. Note that the password is generated so as to be different for each electronic instrument 200. For example, in FIG. 4, the first electronic instrument 200-1 generates "X4D" as the password for the predetermined account in the processing of B4, the second electronic instrument 200-2 generates "Y19" as the password for the predetermined account in the processing of B4, but these passwords are just examples. Moreover, the processing of B4 in FIG. 4 illustrates the password as the predetermined account information, but may generate other information included in the predetermined account information. The same as above also applies to processing of B5 and processing of B6, which will be described later.

At subsequent timing, after the first application is installed in the first terminal device 100-1, as illustrated by A10 in FIG. 3, the first terminal device 100-1 performs for exploring the electronic instrument 200 that is operating in the second mode M2, and finds that the first electronic instrument 200-1 and the second electronic instrument 200-2 are operating in the second mode M2.

Then, the first terminal device 100-1 performs processing for acquiring the password, which is generated by the above-mentioned processing of B4, from the first electronic instrument 200-1. For example, as illustrated in B5, the first terminal device 100-1 transmits, to the first electronic instrument 200-1, a packet requesting this password. Thus, though not shown, the electronic instrument 200 transmits, to the first terminal device 100-1, a response packet including the password. Note that, in the following description, the processing of B5 sometimes shows a series of processing in which the terminal device 100 acquires the password. Likewise, the first terminal device 100-1 performs the processing of B5 also for the second electronic instrument 200-2. Then, the first terminal device 100-1 performs processing for storing the received password in the storage unit 130. That is, in the terminal device 100 according to this embodiment, when the electronic instrument 200 shifts to the second mode M2, the processing unit 120 performs processing for acquiring the predetermined account information generated by the electronic instrument 200 and storing the acquired predetermined account information in the storage unit 130. In this way, the terminal device 100 can automatically store the predetermined account information without the user being involved therein. Thus, the burden on the user about the generation and management of the predetermined account information can be reduced. In the following description and illustration, the processing for storing acquired predetermined account information in the storage unit 130 is sometimes denoted as B6.

Thereafter, the first terminal device 100-1 that has acquired the password as the predetermined account information performs processing for transmitting, to the first electronic instrument 200-1, an instruction to shift from the second mode M2 to the first mode M1. Then, the first electronic instrument 200-1 performs first mode shifting processing. Specifically, for example, the first terminal device 100-1 transmits, to the first electronic instrument 200-1, an instruction to perform processing for restarting the first electronic instrument 200-1, and the first electronic instrument 200-1 performs processing for restarting the first electronic instrument 200-1 itself. Thus, for example, the above-mentioned predetermined mode flag is set OFF, and the electronic instrument 200 will operate in the first mode M1 again. Note that, in the following description and illustration, the processing for transmitting such an instruction to make a shift from the second mode M2 to the first mode M1 is sometimes denoted as B7, and the first mode shifting processing is sometimes denoted as B8. Moreover, the first terminal device 100-1 performs the processing of B7 also for the second electronic instrument 200-2, and the second electronic instrument 200-2 performs the processing of B8. From the above, in the terminal device 100 according to this embodiment, the processing unit 120 acquires the predetermined account information when the electronic instrument 200 operates in the second mode M2, and thereafter, performs the processing for shifting the electronic instrument 200 to the first mode M1. In this way, a period while the electronic instrument 200 operates in the second mode M2 can be minimized. Such minimization is carried out since it is not desired to lengthen, more than necessary, the period while the electronic instrument 200 operates in the second mode M2 from a viewpoint of security.

Note that examples of the processing of B7 and the processing of B8 are not limited to those described above. A specific example of the processing of B7 is arbitrary if the electronic instrument 200 can shift to the first mode M1. Moreover, for example, when a certain period of time or more elapses after timing of shifting from the first mode M1 to the second mode M2, the electronic instrument 200 may define, as the processing of B8, processing for forcibly shifting the electronic instrument 200 itself to the first mode M1 even if the processing of B7 is not present. Further, for example, when a serious error occurs in the electronic instrument 200, the processing for forcibly shifting the electronic instrument 200 itself to the first mode M1 even if the processing of B7 is not present may be defined as the processing of B8.

Figure 5:
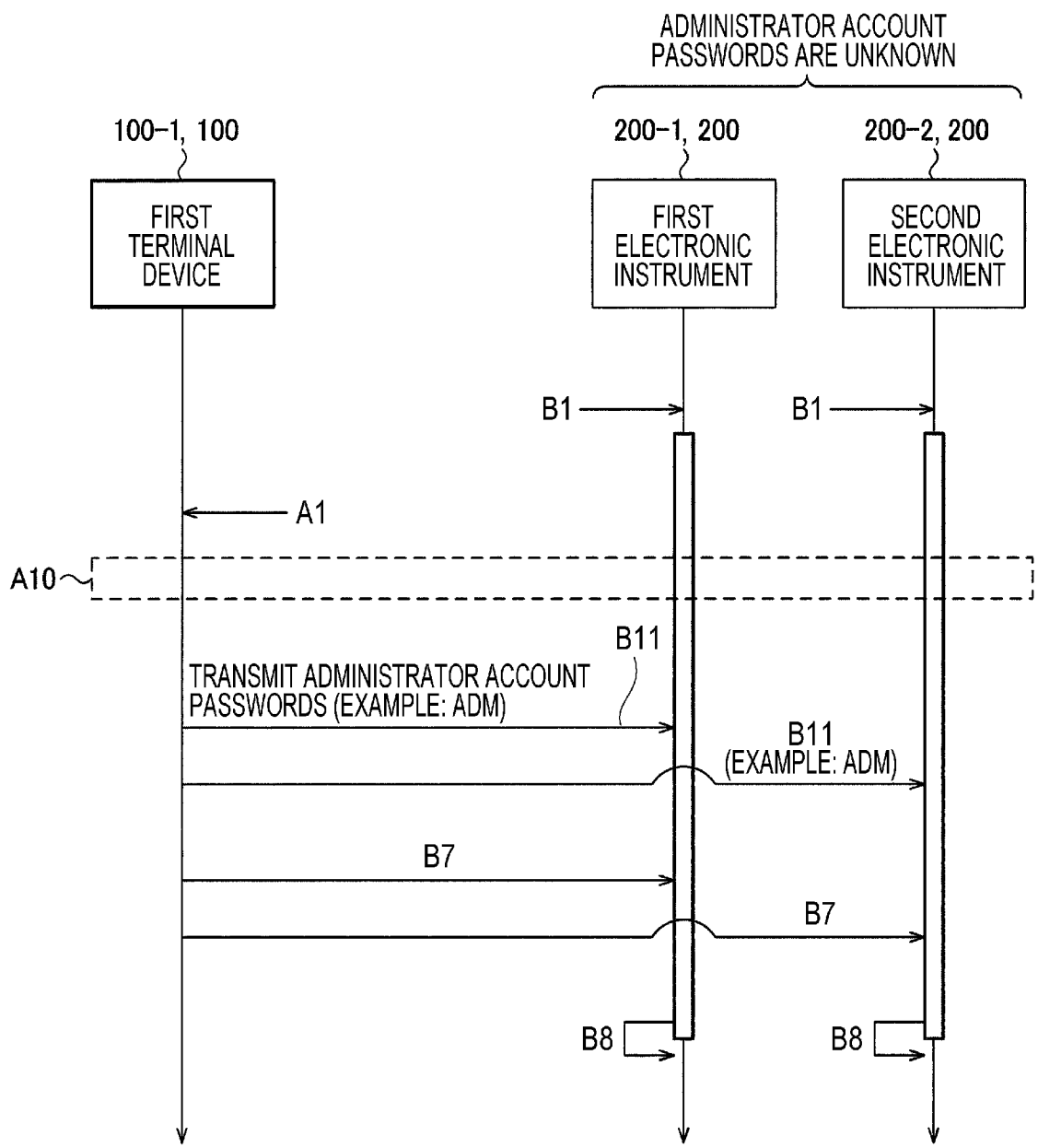
FIG. 5 is a diagram explaining a method for setting an administrator account.

Moreover, though it has been described that the processing illustrated in A20 of FIG. 3 is composed of the pieces of processing or operations, which are illustrated in B1 to B8 in FIG. 4, illustrations regarding the pieces of processing or operations of B2 to B8 will be appropriately omitted for convenience in FIG. 5 and after.

Moreover, during a period while the electronic instrument 200 operates in accordance with the above-described second mode M2, communication between the terminal device 100 and the electronic instrument 200 is encrypted. For example, the processing unit 120 performs processing for obfuscating text, which is included in a data area of a packet conforming to a standard of predetermined communication protocol for use at the time of performing the predetermined processing, and for encrypting the obfuscated text by a common key. Note that the predetermined protocol is, for example, simple network management protocol (SNMP), but may be other communication protocol. For example, when the predetermined communication protocol is SNMP, the terminal device 100 functions as an SNMP manager, and performs, as the predetermined processing, processing for requesting and acquiring management information and the like and processing for requesting a setting change for the electronic instrument 200 that is an SNMP agent. That is, in the terminal device 100 according to this embodiment, the processing unit 120 performs communication by encryption with the electronic instrument 200 when the electronic instrument 200 operates in the second mode M2. In this way, the packet can be prevented from being analyzed by a third party. Thus, security on communication while the electronic instrument 200 operates in the second mode M2 can be enhanced. For example, when the predetermined communication protocol is SNMP, since a packet of a format corresponding to the version SNMP v1 of SNMP is plain text and analyzable, it is desired to obfuscate text included in a protocol data unit (PDU) area that is a data area of the packet, and to encrypt the obfuscated text by a common key.

Moreover, the terminal device 100 may be configured to be capable of setting the administrator account of the electronic instrument 200 during a period while the electronic instrument 200 operates in the second mode M2. For example, as illustrated in FIG. 5, it is assumed that administrator account passwords of the first electronic instrument 200-1 and the second electronic instrument 200-2 are unknown when the first terminal device 100-1 is coupled to the first electronic instrument 200-1 and the second electronic instrument 200-2. The fact that the administrator account passwords are unknown is, for example, that an administrator forgets the administrator account passwords, but for example, may be the fact that the administrator account passwords are still unset, and so on. Moreover, this fact may be in the case where the administrator account passwords of the first electronic instrument 200-1 and the second electronic instrument 200-2 are desired to be updated. In this case, the first terminal device 100-1 performs the predetermined operations denoted as B1 in FIG. 4, thereby shifting the first electronic instrument 200-1 and the second electronic instrument 200-2 from the first mode M1 to the second mode M2. Thereafter, at timing when the first application is installed in the first terminal device 100-1, the first terminal device 100-1 performs the processing for exploring the electronic instrument 200 in the second mode M2, the processing being illustrated in A10 of FIG. 3. Then, the first terminal device 100-1 performs processing for transmitting the administrator account password to the first electronic instrument 200-1. In the following description and illustration, the processing in which terminal device 100 transmits the administrator account password to the electronic instrument 200 is sometimes denoted as B11. The administrator account password herein is a password generated by the first terminal device 100-1, and is denoted as "ADM" in FIG. 5, but this is an example. From the above, in the terminal device 100 according to this embodiment, the processing unit 120 performs the processing for setting the administrator account of the electronic instrument 200 when the electronic instrument 200 operates in the second mode M2. In this way, the convenience of the electronic instrument 200 can be improved. For example, when the administrator or the like forgets the administrator passwords as mentioned above, the administrator or the like can easily reset the administrator account information. Moreover, the administrator or the like can update the administrator account information collectively for the plurality of electronic instruments 200.

Likewise, the first terminal device 100-1 performs the processing of B11 also for the second electronic instrument 200-2. The administrator account password herein is the same as in the case of the first electronic instrument 200-1.

Thereafter, the first terminal device 100-1 performs the same processing as in B7 of FIG. 4 for the first electronic instrument 200-1 and the second electronic instrument 200-2. Then, the first electronic instrument 200-1 and the second electronic instrument 200-2 perform the same processing as in B8 of FIG. 4, and will operate in the first mode M1.

Moreover, authority of the administrator account according to this embodiment may be differentiated from authority of the above-mentioned predetermined account, for example, as in FIG. 6. When the administrator account is registered in the electronic instrument 200, processing based on all functions owned by the application installed in the terminal device 100 can be performed for the electronic instrument 200. Meanwhile, when the predetermined account is registered in the electronic instrument 200, the predetermined processing can be performed for the electronic instrument 200. That is, for example, the user cannot make a specific setting regarding the predetermined processing unless the user registers the administrator account. Moreover, the predetermined account can be set to be valid or invalid. For example, even if the predetermined account is registered in the electronic instrument 200, when the predetermined account is invalidated, the terminal device 100 cannot perform the predetermined processing for the electronic instrument 200. From the above, the predetermined account information according to this embodiment is account information settable separately from the administrator account information. In this way, the user or the like can appropriately operate the administrator account and the predetermined account for the electronic instrument 200.

Figure 7:
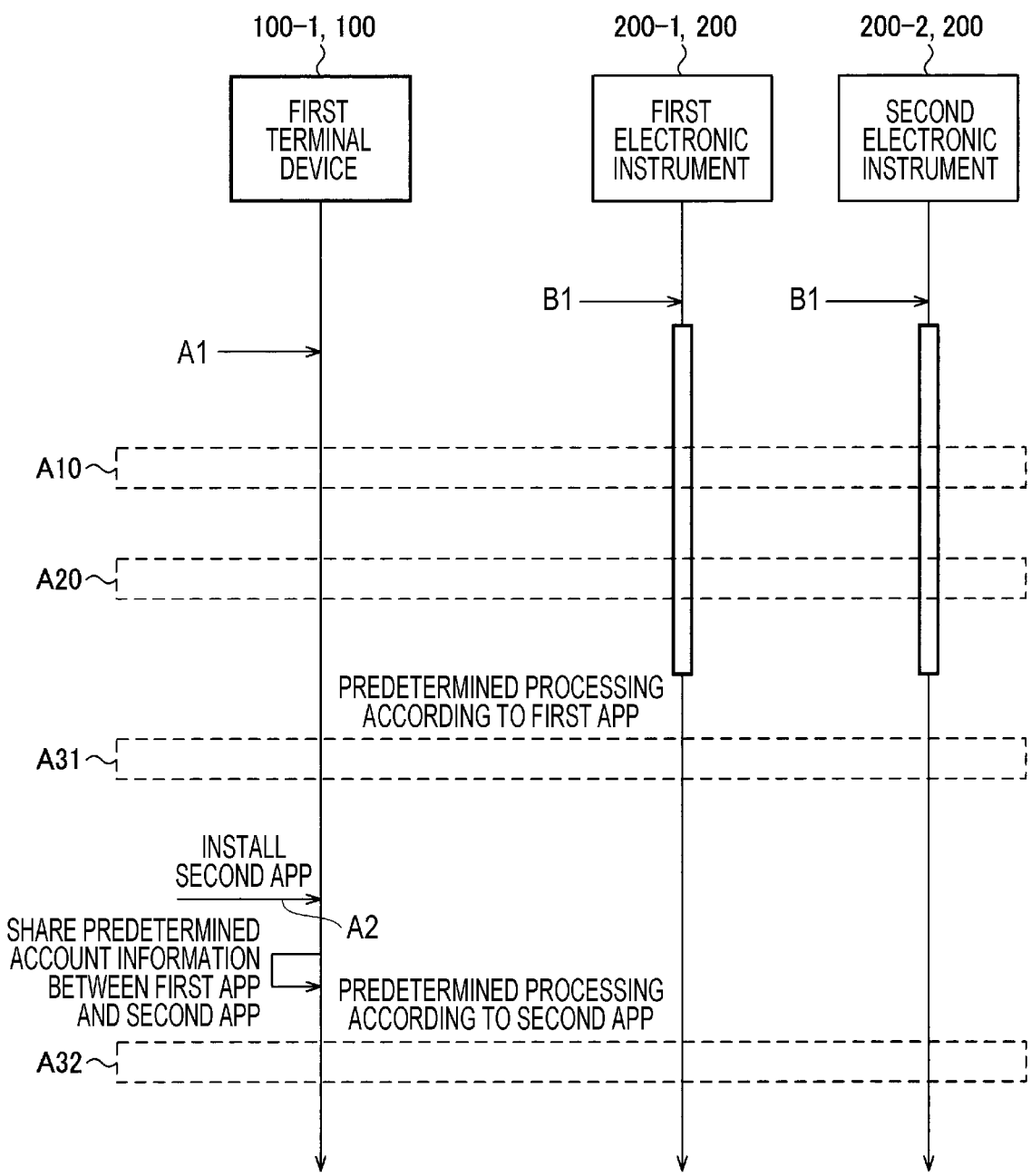
FIG. 7 is a diagram explaining a method for sharing predetermined account information in a same terminal device.

Moreover, in the same terminal device 100, predetermined applications may be enabled to share the predetermined account information. Referring to FIG. 7, a description will be given of an example of a method for sharing the predetermined account information between the first application and the second application. For example, as in FIG. 5, it is assumed that, when the first terminal device 100-1 is coupled to the first electronic instrument 200-1 and the second electronic instrument 200-2, the user performs the operation of B1 to shift the first electronic instrument 200-1 and the second electronic instrument 200-2 from the first mode M1 to the second mode M2. Thereafter, the user installs the first application in the first terminal device 100-1, thereby performing the same pieces of processing as those of A10 and A20 in FIG. 3. Thus, as in A31 of FIG. 3, the first terminal device 100-1 will perform the predetermined processing according to the first application for the first electronic instrument 200-1 and the second electronic instrument 200-2.

It is assumed that the user thereafter performs an operation of installing the second application in the first terminal device 100-1. In the following description and illustration, the operation where the user installs the second application in the terminal device 100 is sometimes denoted as A2. Thereafter, the processing unit 120 executes processing for sharing the predetermined account information between the first application and the second application. For example, in operating the second application, the first terminal device 100-1 performs processing for referring to a storage area in the storage unit 130, the storage area storing the predetermined account information. Thus, for example, when the user performs the operation of A2 as in the case of the first application, display to the effect that input of the account information is required, and the like are displayed on the display unit (not shown) of the first terminal device 100-1. Then, in accordance with the predetermined account information stored in the storage unit 130 by the processing of B6 in FIG. 4, the processing unit 120 performs processing for inputting the account information by automatically using the predetermined account information, and completes the installation of the second application. Thus, the first terminal device 100-1 will perform the predetermined processing according to the second application for the first electronic instrument 200-1 and the second electronic instrument 200-2. Note that, in the following description and illustration, the predetermined processing from the terminal device 100 to the electronic instrument 200 according to the second application is sometimes denoted as A32. As described above, in the terminal device 100 according to this embodiment, the processing unit 120 performs processing for storing, in the storage unit 130, the predetermined account information acquired by the first application program in the second mode M2. Then, in performing, in the first mode M1, processing according to the second application program different from the first application program, the processing unit 120 performs the predetermined processing by using the predetermined account information. In this way, for example, in performing the installation of the second application, the user no longer needs to perform again such an operation of shifting the electronic instrument 200 to the second mode M2, and so on. Thus, the user can easily perform the predetermined processing according to the second application. Note that, in the terminal device 100, software other than the predetermined application is not allowed to refer to the storage area in the storage unit 130, in which the predetermined account information is stored.

Figure 8:
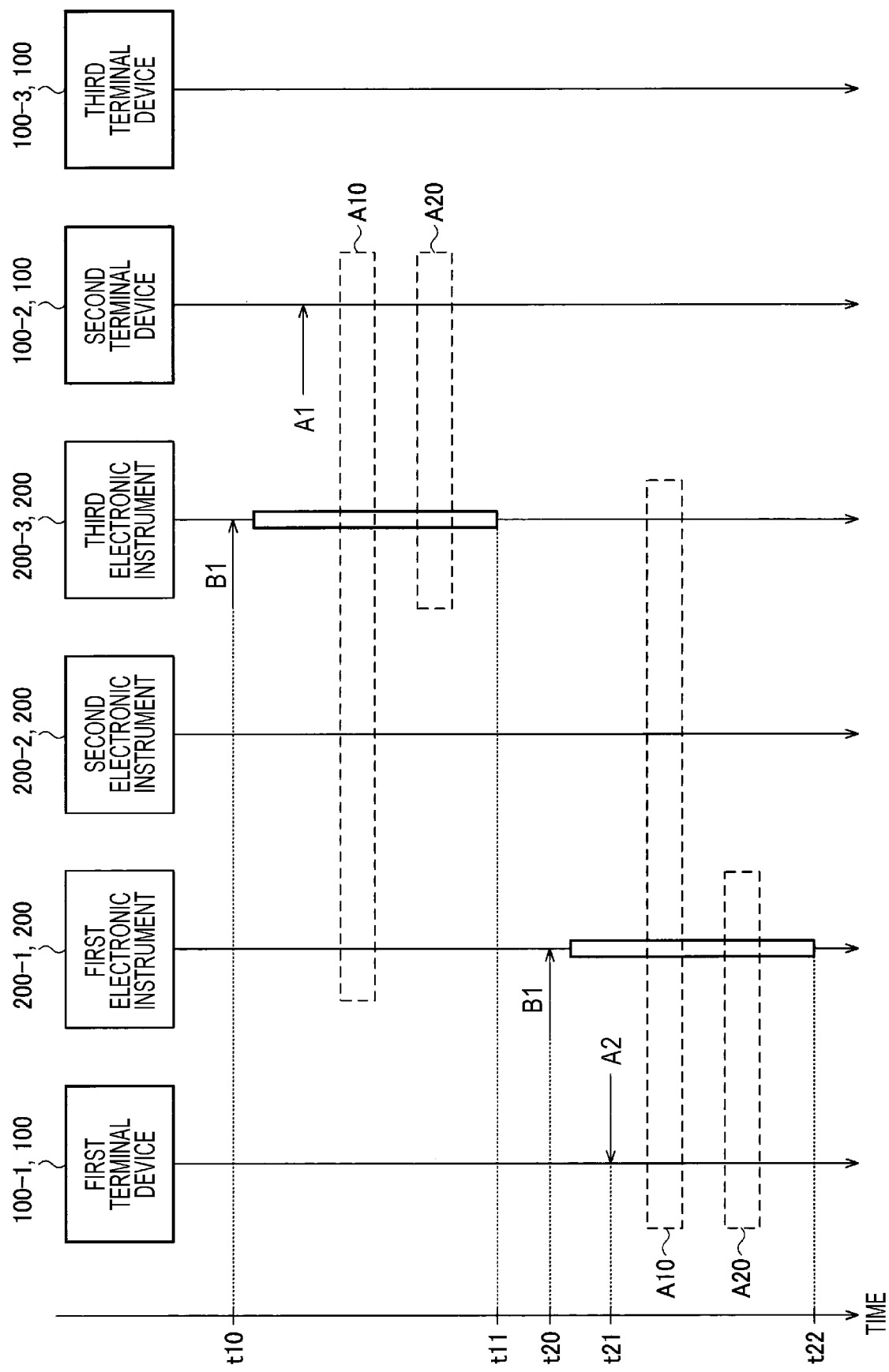
FIG. 8 is a diagram explaining a method for sharing predetermined account information between different terminal devices.
Figure 9:
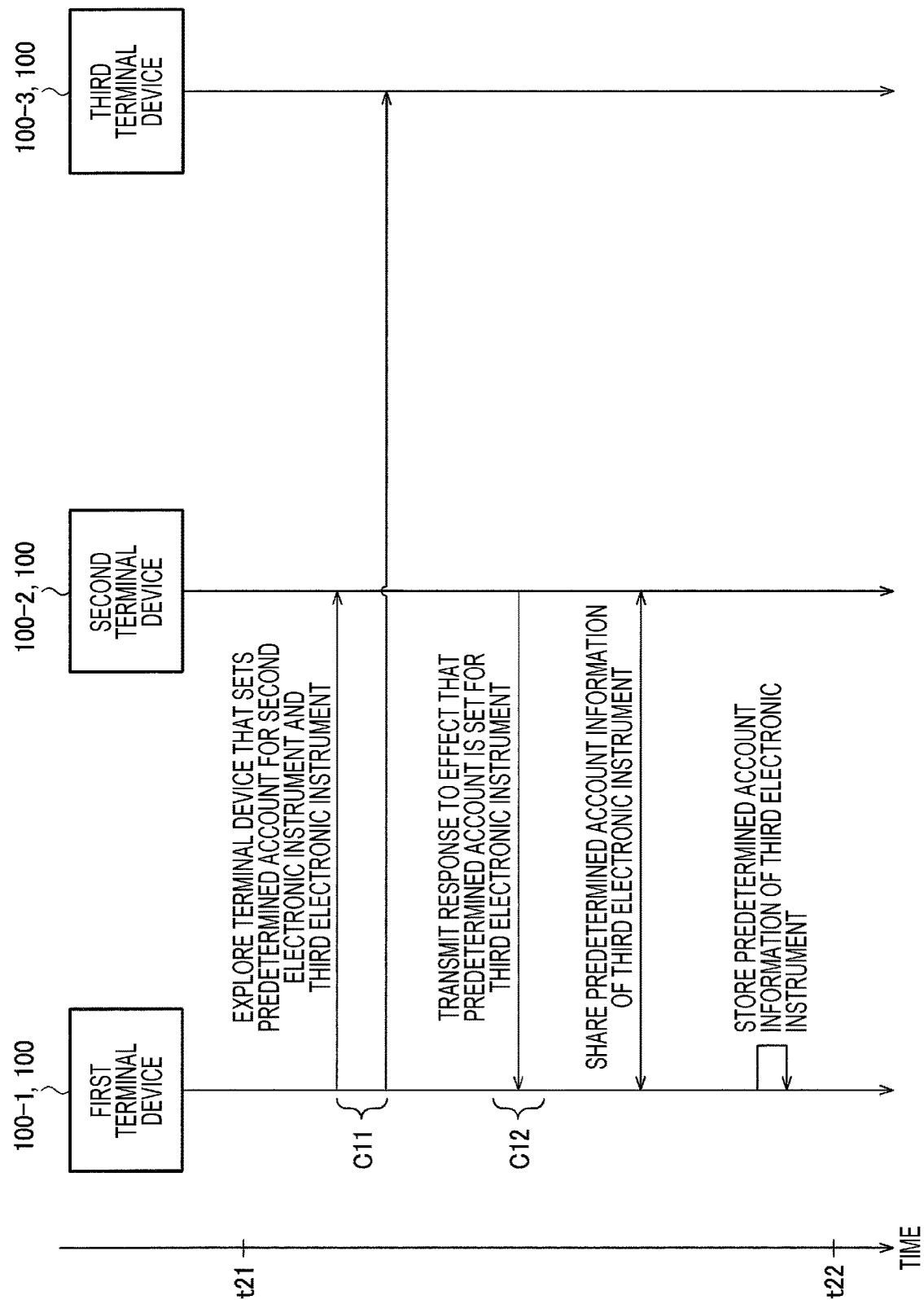
FIG. 9 is another diagram explaining the method for sharing the predetermined account information between the different terminal devices.
Figure 10:
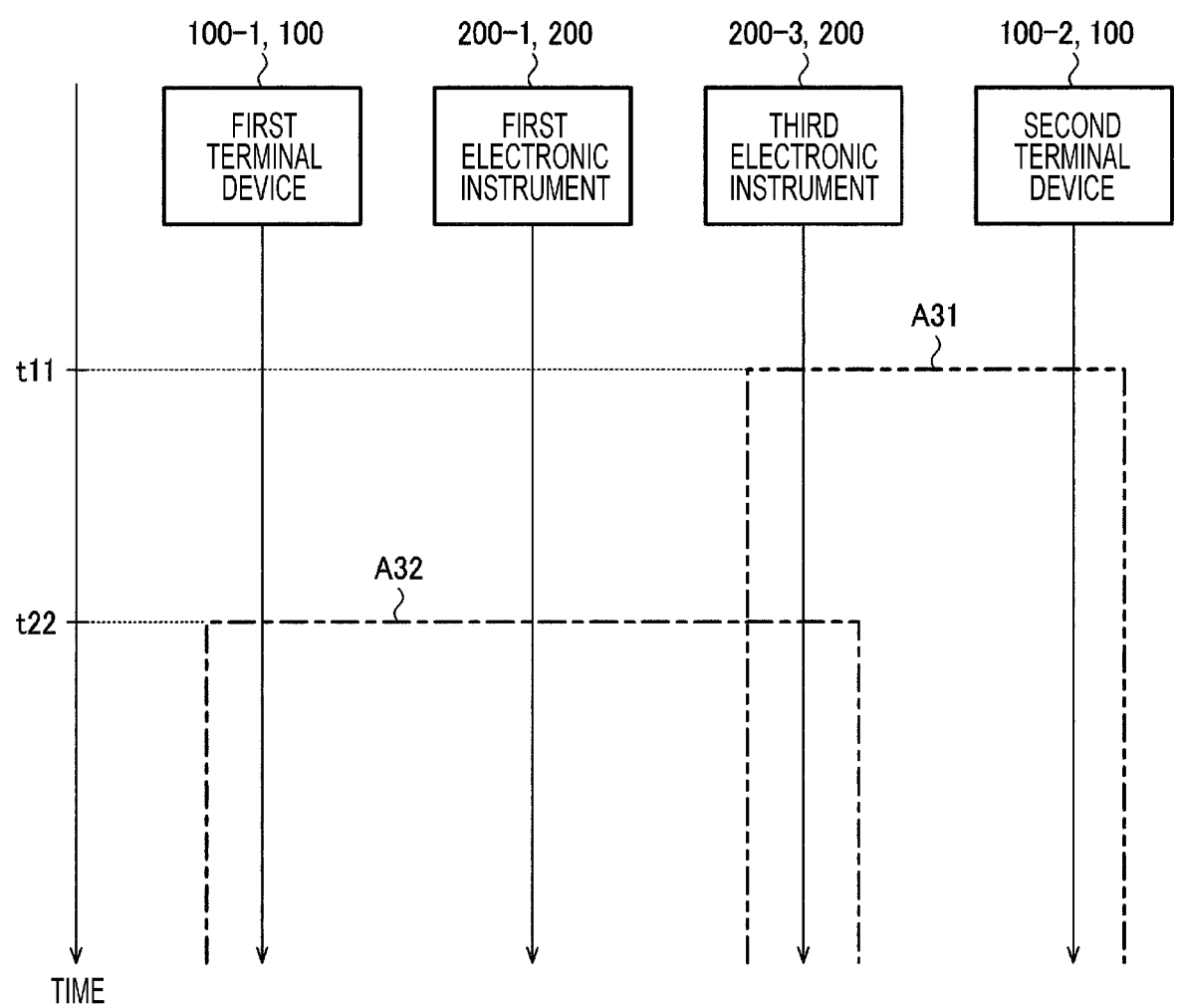
FIG. 10 is another diagram explaining the method for sharing the predetermined account information between the different terminal devices.

Moreover, as illustrated in FIGS. 8 to 10, the predetermined application of the terminal device 100 may be configured to be capable of sharing the predetermined account with a predetermined application installed in the other terminal device 100 coupled to the network. Note that, in the example in FIGS. 8 to 10, it is assumed that, as illustrated in FIG. 2, the first terminal device 100-1, the second terminal device 100-2, the third terminal device 100-3, the first electronic instrument 200-1, the second electronic instrument 200-2, and the third electronic instrument 200-3 are coupled to the same network.

At timing t10, the user performs the predetermined operation (B1) for the third electronic instrument 200-3, and shifts the third electronic instrument 200-3 from the first mode M1 to the second mode M2. Thereafter, the user performs the operation (A1) for installing the first application in the second terminal device 100-2. The second terminal device 100-2 explores the electronic instrument 200 that operates in the second mode M2 (A10), and sets the predetermined account with the third electronic instrument 200-3 (A20). Then, it is assumed that, at timing t11, the third electronic instrument 200-3 shifts from the second mode M2 to the first mode M1. Note that it is assumed that the first application is not installed in the first terminal device 100-1 and the third terminal device 100-3, and that the first electronic instrument 200-1 and the second electronic instrument 200-2 are operating in the first mode M1.

Thereafter, at timing T20, the user performs the predetermined operation (B1) for the first electronic instrument 200-1, and shifts the first electronic instrument 200-1 from the first mode M1 to the second mode M2. Note that it is assumed that the second application is not installed in the second terminal device 100-2 and the third terminal device 100-3, and that the second electronic instrument 200-2 and the third electronic instrument 200-3 are operating in the first mode M1.

Thereafter, at timing t21, the user performs the operation (A2) for installing the second application in the first terminal device 100-1. The first terminal device 100-1 explores the electronic instrument 200 that operates in the second mode M2 (A10), and sets the predetermined account with the first electronic instrument 200-1 (A20). Then, at timing t22, the first electronic instrument 200-1 shifts from the second mode M2 to the first mode M1.

Meanwhile, during a period from the timing t21 to the timing t22, the processing illustrated in FIG. 9 is further performed between the predetermined applications of the terminal devices 100 coupled to the network. For example, upon determining that the response packets are not received from the second electronic instrument 200-2 and the third electronic instrument 200-3, the first terminal device 100-1 performs the processing for exploring the terminal device 100, which sets the predetermined accounts for the second electronic instrument 200-2 and the third electronic instrument 200-3, by the processing of A10 as illustrated in C11 of FIG. 9. More specifically, for example, the first terminal device 100-1 multicasts, to the second terminal device 100-2 and the third terminal device 100-3, the response request that asks whether or not to set the predetermined account for the second electronic instrument 200-2 or the third electronic instrument 200-3.

Then, as illustrated in C12 of FIG. 9, the second terminal device 100-2 performs processing for transmitting, to the first terminal device 100-1, a response packet to the effect that the second terminal device 100-2 is setting the predetermined account for the third electronic instrument 200-3.

Thereafter, the first terminal device 100-1 and the second terminal device 100-2 share the predetermined account information of the third electronic instrument 200-3 therebetween. More specifically, the first application of the second terminal device 100-2 communicates with the second application of the first terminal device 100-1, and performs processing for transmitting the predetermined account information of the third electronic instrument 200-3 to the first terminal device 100-1. Then, the first terminal device 100-1 performs processing for storing the predetermined account information of the third electronic instrument 200-3 in the storage unit 130. Thus, as illustrated in FIG. 10, for the first electronic instrument 200-1 and the third electronic instrument 200-3, the first terminal device 100-1 becomes capable of performing the predetermined processing (A32) according to the second application at the timing t22 and after. As described above, in the terminal device 100 according to this embodiment, the processing unit 120 acquires, via the communication unit 110, the predetermined account information acquired by the other terminal device 100 when the electronic instrument 200 operates in the second mode M2, and performs processing for storing the predetermined account information in the storage unit 130. In this way, the user can easily acquire the predetermined account information.

Note that the timing of sharing the predetermined account information between the predetermined applications is not limited to the timing of installing the predetermined applications as in FIG. 8 and the like, and the predetermined account information may be shared continuously at regular timing after this installation is completed. That is, FIG. 10 illustrates that the second terminal device 100-2 can perform the predetermined processing (A31) according to the first application only for the third electronic instrument 200-3 at the timing t11 and after, but at subsequent predetermined timing, may perform processing for the predetermined account information of the first electronic instrument 200-1. Thus, the second terminal device 100-2 can perform the predetermined processing (A31) according to the first application for the first electronic instrument 200-1 and the third electronic instrument 200-3.

Note that FIGS. 8 to 10 are examples of sharing the predetermined account information between the terminal devices 100 which are different, and are not examples of sharing the administrator account information. As mentioned with reference to FIG. 6, the authority of the administrator account is wider than the predetermined account, and from a viewpoint of security, it is not desired to share the administrator account. However, in some cases, it is more convenient that the administrator account can be shared between the different terminal devices 100 in a predetermined situation. Accordingly, under a predetermined condition, the terminal device 100 that sets the administrator account from the electronic instrument 200 that is operating in the second mode M2 may be enabled to share the administrator account of the other electronic instrument 200. Note that the predetermined situation herein is, for example, a case in which the position of the administrator of such other electronic instrument 200 is extremely distant from the user's position. The predetermined condition will be described later with reference to FIG. 11 and the like.

Note that, though not shown, in examples to be described later with reference to FIGS. 11 and 12, it is assumed that the first terminal device 100-1, the second terminal device 100-2, the third terminal device 100-3, the first electronic instrument 200-1, and the second electronic instrument 200-2 are coupled to the same network.

For example, as illustrated in FIG. 11, it is assumed that, at timing t30, the administrator of the first terminal device 100-1 performs the predetermined operation (B1) for the first electronic instrument 200-1, and thereafter, performs the operation (A1) of installing the first application in the first terminal device 100-1. Then, the first terminal device 100-1 performs processing (B11) for setting the administrator account for the first electronic instrument 200-1, and performs processing for setting ON a first electronic instrument-ready predetermined flag that is a predetermined flag for an electronic instrument. Note that, though the processing of A10, B7 and B8 is also performed as in FIG. 5, a description thereof and an illustration thereof in FIG. 11 will be omitted.

The predetermined flag for an electronic instrument is a flag that determines whether or not to respond to a response request to the effect that the administrator account is requested to be shared when this response request is received, and is OFF in initial setting. Though a flow is not shown, the terminal device 100 performs processing for turning ON the predetermined flag for an electronic instrument in the case of setting the administrator account for the electronic instrument 200 that operates in the second mode M2. Meanwhile, when the terminal device 100 sets the administrator account for the electronic instrument 200 that operates in the first mode M1, the processing for turning ON the predetermined flag for an electronic instrument is not automatically performed. In the example of FIG. 11, the administrator of the first terminal device 100-1 sets the administrator account in a state of shifting the first electronic instrument 200-1 to the second mode M2, and accordingly, the first terminal device 100-1 performs the processing for turning ON the first electronic instrument-ready predetermined flag as mentioned above.

It is assumed that, thereafter, at timing t40, in a state of operating all the electronic instruments 200 in the first mode M1, the administrator of the second terminal device 100-2 installs the first application in the second terminal device 100-2, and sets the administrator account for the first electronic instrument 200-1. That is, the administrator of the second terminal device 100-2 sets the administrator account for the second terminal device 100-2 by referring to the administrator account information of the first terminal device 100-1. In this case, the first electronic instrument-ready predetermined flag of the second terminal device 100-2 remains OFF.

Thereafter, it is assumed that, at timing t50, the administrator of the third terminal device 100-3 performs the predetermined operation (B1) for the second electronic instrument 200-2, and thereafter, performs the operation (A1) of installing the first application in the third terminal device 100-3. The third terminal device 100-3 performs the processing (B11) for setting the administrator account for the second electronic instrument 200-2, and performs processing for setting ON a second electronic instrument-ready predetermined flag that is a predetermined flag for an electronic instrument. Note that, though the processing of A10, B7 and B8 is also performed as in FIG. 5, a description thereof and an illustration thereof in FIG. 11 will be omitted.

Moreover, at the timing t50 and after, the third terminal device 100-3 further performs processing illustrated in FIG.

12. Specifically, for example, as illustrated in D11 of FIG. 12, the third terminal device 100-3 multicasts, to the first terminal device 100-1 and the second terminal device 100-2, a response request that asks whether or not to set the administrator account of the first electronic instrument 200-1.

Then, as illustrated in D12, the first terminal device 100-1 performs processing for transmitting, to the third terminal device 100-3, a response packet to the effect that the first terminal device 100-1 is setting the administrator account of the first electronic instrument 200-1. Meanwhile, though administrator account of the first electronic instrument 200-1 is set in the second terminal device 100-2, the second terminal device 100-2 does not perform the processing for transmitting the response packet to the third terminal device 100-3. This is because, though the first electronic instrument-ready predetermined account is set ON in the first terminal device 100-1 as mentioned above, the first electronic instrument-ready predetermined account is set OFF in the second terminal device 100-2.

Thereafter, as illustrated in D13, the third terminal device 100-3 performs processing for transmitting, to the first terminal device 100-1, a packet including contents regarding a request for permission to share the administrator account of the first electronic instrument 200-1. Thus, for example, on the display unit (not shown) of the first terminal device 100-1, the administrator of the first terminal device 100-1 recognizes that the request for permission to share this administrator account has been made. Note that, for example, by the processing of D13, processing for transmitting electronic mail to the administrator of the first terminal device 100-1 may be performed, and it is possible to carry out the processing of D13 while modifying the same in various ways.

Thereafter, in the case of determining to permit the third terminal device 100-3 to share the administrator account of the first electronic instrument 200-1, the administrator of the first terminal device 100-1 performs the processing, which is illustrated in D14, by operating the first terminal device 100-1. Specifically, the first terminal device 100-1 performs processing for transmitting, to the third terminal device 100-3, a packet to the effect that third terminal device 100-3 is permitted to share the administrator account of the first electronic instrument 200-1. Note that the first terminal device 100-1 may perform processing for transmitting the information of the administrator account of the first electronic instrument 200-1 to the third terminal device 100-3 in combination with this packet transmission processing or separately therefrom.

Then, the third terminal device 100-3 performs the processing for storing the administrator account information of the first electronic instrument 200-1 in the storage unit 130. Thus, the third terminal device 100-3 can set the administrator account for the first electronic instrument 200-1 and the second electronic instrument 200-2. From the above, in the third terminal device 100-3 as the terminal device 100 according to this embodiment, the processing unit 120 performs the processing for setting the administrator account of the first electronic instrument 200-1 by using the administrator account information set by the first terminal device 100-1 as the other terminal device 100 when the first electronic instrument 200-1 operates in the second mode M2. In this way, the user can acquire the administrator account of the electronic instrument 200, to which the administrator account is desired to be set, without accessing this electronic instrument 200. Thus, the user can easily acquire the administrator account information. Moreover, the method according to this embodiment is not limited to the above, and the fact that the electronic instrument-ready predetermined flag is ON may be further shared as well as the administrator account information. For example, though a flowchart is not shown, upon receiving the packet of the permission illustrated in D14 of FIG. 12, the third terminal device 100-3 performs processing for turning ON the first electronic instrument-ready predetermined flag. Thus, the first terminal device 100-1 and the third terminal device 100-3 can share the fact that the first electronic instrument-ready predetermined flag is ON.

As described above, the terminal device according to this embodiment includes: a communication unit that communicates with an electronic instrument operable in a first mode that is a normal mode and in a second mode; a storage unit; and a processing unit. The second mode is a mode for setting predetermined account information for performing predetermined processing with the electronic instrument in the first mode. The storage unit stores the predetermined account information. The processing unit performs predetermined processing with the electronic instrument in accordance with the predetermined account information stored in the storage unit in the first mode.

In this way, the user no longer needs to set the predetermined account information with the electronic instrument that operates in the first mode. Thus, the burden on the user about the account management of the electronic instrument can be reduced.

Moreover, when the electronic instrument shifts to the second mode, the processing unit may perform processing for acquiring the predetermined account information generated by the electronic instrument and storing the acquired predetermined account information in the storage unit.

In this way, the burden on the user about the generation and management of the predetermined account information can be reduced.

Moreover, the second mode may be a mode to which the electronic instrument shifts from the first mode by a predetermined operation performed for the electronic instrument by the user.

In this way, the condition for shifting the electronic instrument from the first mode to the second mode can be optimized.

Moreover, the processing unit may perform processing for storing, in the storage unit, the predetermined account information acquired by a first application program in the second mode, and in performing, in the first mode, processing according to a second application program different from the first application program, may perform the predetermined processing by using the predetermined account information.

In this way, the user can easily perform the predetermined processing according to the second application.

Further, the processing unit may perform processing for acquiring, via the communication unit, the predetermined account information acquired by the other terminal device when the electronic instrument operates in the second mode, and for storing the predetermined account information in the storage unit.

In this way, the user can easily acquire the predetermined account information.

Moreover, the processing unit may perform processing for setting an administrator account of the electronic instrument when the electronic instrument operates in the second mode.

In this way, convenience of the terminal device and the electronic instrument can be improved.

Further, the processing unit may perform processing for setting the administrator account of the electronic instrument by using administrator account information set by the other terminal device when the electronic instrument operates in the second mode.

In this way, the user can easily acquire the administrator account information.

Moreover, the predetermined account information may be account information settable separately from the administrator account information.

In this way, the user or the like can appropriately operate the administrator account and the predetermined account for the electronic instrument.

Further, the processing unit may perform processing for shifting the electronic instrument to the first mode after acquiring the predetermined account information when the electronic instrument operates in the second mode.

In this way, a period while the electronic instrument operates in the second mode can be minimized.

Moreover, the processing unit may perform communication by encryption with the electronic instrument when the electronic instrument operates in the second mode.

In this way, security on communication while the electronic instrument operates in the second mode can be enhanced.

Further, the processing system according to this embodiment includes the above-described terminal device and the electronic instrument.

Moreover, the program according to this embodiment causes a computer to function as: a communication unit that communicates with an electronic instrument operable in a first mode that is a normal mode and in a second mode; a storage unit; and a processing unit. The second mode is a mode for setting predetermined account information for performing predetermined processing with the electronic instrument in the first mode. The storage unit stores the predetermined account information. The processing unit performs the predetermined processing with the electronic instrument in accordance with the predetermined account information stored in the storage unit in the first mode.

Note that, though the detailed description has been given of this embodiment as above, those skilled in the art could easily understand that may modifications without substantially departing from the new matter and effects of this embodiment can be made. Hence, it is defined that all of such modified examples are included in the scope of the present disclosure. For example, in the specification or the drawings, terms at least once described with different terms in the broader or synonymous senses may be replaced by the different terms in any part of the specification or the drawings. Moreover, all combinations of this embodiment and the modified examples are also included in the scope of the present disclosure. Further, the configurations and operations of the terminal device, the processing system, the program and the like are not limited to those described in this embodiment, and a variety of modifications can be made.

What is claimed is:

1. A terminal device, comprising:
   a communicator that communicates with an electronic instrument operable in a first mode that is a normal mode and in a second mode;
   a processor configured to acquire, from the electronic instrument which is in the second mode, predetermined account information for performing predetermined processing with the electronic instrument in the first mode; and
   a storage configured to store the acquired predetermined account information, wherein
      the predetermined account information is acquired by based on a first application program, and
      the processor is further configured to:
         install a second application program; and
         perform the predetermined processing according to the second application program with the electronic instrument in the first mode, wherein the first application program is different from the second application program.

2. The terminal device according to claim 1, wherein, when the electronic instrument shifts to the second mode from the first mode, the processor is further configured to acquire the predetermined account information and store the acquired predetermined account information in the storage, and
   the electronic instrument generates the predetermined account information.

3. The terminal device according to claim 1, wherein the second mode is a mode to which the electronic instrument shifts from the first mode by a predetermined operation performed for the electronic instrument by a user.

4. The terminal device according to claim 1, wherein the processor is further configured to:
   acquire, via the communicator, the predetermined account information acquired by another terminal device when the electronic instrument operates in the second mode; and
   store the predetermined account information in the storage.

5. The terminal device according to claim 1, wherein the processor is further configured to set an administrator account of the electronic instrument when the electronic instrument operates in the second mode.

6. The terminal device according to claim 5, wherein the processor is further configured to set the administrator account of the electronic instrument by using administrator account information set by another terminal device when the electronic instrument operates in the second mode.

7. The terminal device according to claim 6, wherein the predetermined account information is account information settable separately from the administrator account information.

8. The terminal device according to claim 1, wherein the processor is further configured to acquire the predetermined account information when the electronic instrument operates in the second mode, and thereafter, shift the electronic instrument to the first mode.

9. The terminal device according to claim 1, wherein the processor is further configured to communicate encryption with the electronic instrument when the electronic instrument operates in the second mode.

10. A processing system, comprising:
    the terminal device according to claim 1; and
    the electronic instrument.

11. A non-transitory computer-readable medium having stored thereon, computer-executable instructions which, when executed by a computer, cause the computer to execute operations, the operations comprising:
    communicating with an electronic instrument operable in a first mode that is a normal mode and in a second mode;
    acquiring from the electronic instrument which is in the second mode, predetermined account information for performing predetermined processing with the electronic instrument in the first mode;

storing the acquired predetermined account information, wherein
the predetermined account information is acquired by a first application program;
installing a second application program; and
performing the predetermined processing according to the second application program with the electronic instrument in the first mode, wherein
the first application program is different from the second application program.

* * * * *